(12) United States Patent
Eschke et al.

(10) Patent No.: US 6,447,133 B1
(45) Date of Patent: Sep. 10, 2002

(54) LIGHTING FITTING WITH A DIFFUSSER

(75) Inventors: Bernd Eschke, Salzdetfurth (DE); Siegfried Vogt, Hildesheim (DE); Heinrich Flohr, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/849,897

(22) PCT Filed: Aug. 2, 1996

(86) PCT No.: PCT/DE96/01437
§ 371 (c)(1),
(2), (4) Date: Aug. 22, 1997

(87) PCT Pub. No.: WO97/14981
PCT Pub. Date: Apr. 24, 1997

(30) Foreign Application Priority Data

Oct. 19, 1995 (DE) .......................................... 195 38 893

(51) Int. Cl.⁷ .................................................. F21V 7/04
(52) U.S. Cl. .......................................................... 362/31
(58) Field of Search ............................... 349/65; 362/31, 362/307, 311, 235, 330, 331, 355, 489

(56) References Cited

U.S. PATENT DOCUMENTS

| | | | | |
|---|---|---|---|---|
| 3,984,176 A | * | 10/1976 | Hirai et al. | 349/65 |
| 4,729,068 A | * | 3/1988 | Ohe | 362/31 |
| 5,856,855 A | * | 1/1999 | Mol et al. | 349/65 |

\* cited by examiner

*Primary Examiner*—Cassandra Spyrou
*Assistant Examiner*—Craig Curtis
(74) *Attorney, Agent, or Firm*—Kenyon & Kenyon

(57) ABSTRACT

An illumination member with a diffuser in which spheres or particles having a different refractive index compared to the diffuser are distributed. The luminance on the output face of the diffuser can be controlled with the number, size and homogeneity of the diffused spheres or particles. A suitable illumination device can set the luminance to bright or dark depending on how it is operated. One preferred application is the illumination of liquid crystal displays or measuring devices in a motor vehicle.

25 Claims, 2 Drawing Sheets

FIG. 5
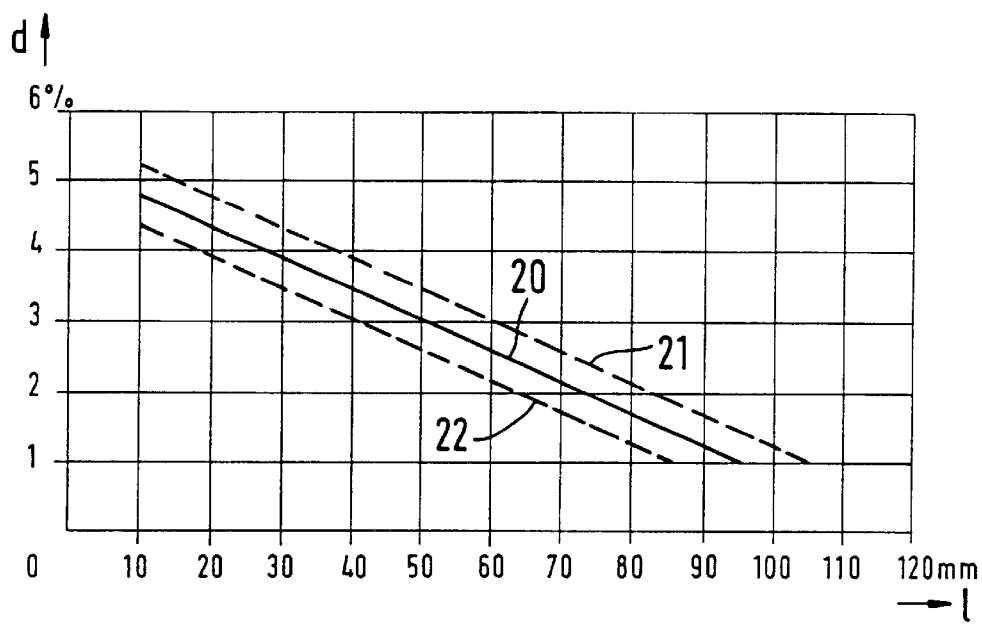
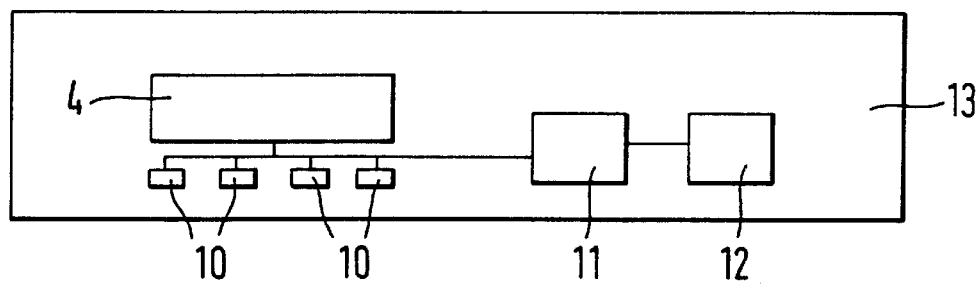
FIG. 6

LIGHTING FITTING WITH A DIFFUSSER

FIELD OF THE INVENTION

The present invention relates to an illumination member with a diffuser.

BACKGROUND INFORMATION

An illumination member is frequently used in order to uniformly illuminate transmissive liquid crystal displays (LCDs) in particular. There, the light from preferably one or more laterally arranged light sources is directed into the diffuser which acts as a photoconductor. The aim is to have the light as uniformly distributed as possible over the entire output face with a good efficiency. This results in a relatively large design, which seems less suitable for use in flat LC displays. Particularly in motor vehicle displays or in car radios, a thick illumination member is not suitable for an LC-display due to spatial constraints.

SUMMARY OF THE INVENTION

The illumination member according to the present invention with the distinguishing features of the main claim has the advantage that the diffuser is designed to be only a few millimeters thick and still emit a homogeneously distributed luminance on its output face. Together with an LC display, the entire unit is only a few millimeters thick so that it is preferably usable also in a motor vehicle display or in a car radio. Due to the simple and flat structure, moreover, the manufacturing costs are comparably low advantageous manner. Due to the low loss of the diffuser, moreover, a favorable efficiency is achieved for the illumination.

The efficiency of the diffuser is further improved by arranging reflectors on one or more of the sides of the diffuser which do not border on the output face. This directs the scattered light in the direction towards the output face so that a further improvement in the efficiency is achieved.

The good efficiency of the diffuser is achieved basically by distributing diffusing transparent spheres or particles having a different refractive index than the diffuser into the photoconductor. The light is advantageously deflected and diffusely distributed in this manner in the boundary junction between the photoconductor and the spheres or particles.

Preferable light sources are lamps, tubes or light-emitting diodes since they are conventional.

If the light source is arranged on a face of the diffuser, the thickness of the diffuser is not increased by the arrangement of the light source. Moreover, the light source can be easily replaced during repair.

Such an illumination member is suited preferably for illuminating a display or a control panel or a symbol illumination. Particularly with the illumination member, a transmissive LC display can be illuminated since the LC display alone does not emit any light.

It is particularly advantageous that the light sources are powered from a control unit so that when the display or a control element is touched, the light sources are made brighter for a specified time.

This is particularly important when used in a motor vehicle. For example, during night travel, the normal brightness of the display can be relatively dark (sleep mode) to avoid blinding (distracting) the driver. When a control element or an appropriate sensor in the display is touched, the luminance is increased for a specific time so that the display is more clearly visible. After the operating function is completed or the specific time elapses, the display can then switch back to sleep mode. The safety in the vehicle is thus increased in an advantageous manner.

BRIEF DESCRIPTION OF THE DRAWINGS

FIG. 5 shows a graph of the average light decoupling length versus the diffusion doping.

FIG. 6 shows a block diagram of yet another embodiment of an illumination member according to the present invention.

DETAILED DESCRIPTION OF THE DRAWINGS

Figure 1:
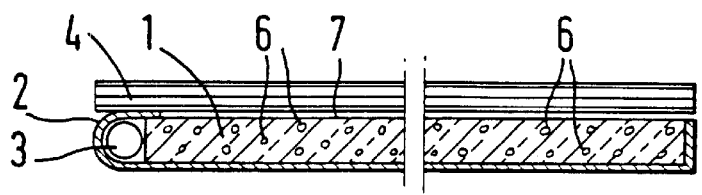
FIG. 1 shows a cross section of an illumination member with a diffuser according to the present invention.

FIG. 1 shows a cross-section of a diffuser 1 that is designed as a flat, transparent plate, e.g., having a thickness of three millimeters. It has on its bottom side and lateral surfaces a reflector 2, whereas its top side, the output face 7 is left open so light can emerge. On the left side, at least one light source is arranged as a lamp, tube or light-emitting diode (LED). The light source 3 transmits its light into the diffuser 1, which light is deflected towards the output face 7. Above the output face 7, a transmissive liquid crystal display (LCD) 4 is arranged. The LCD 4 is permeated by the light from the light source 3. The diffuser 1 contains a multitude of small spheres or particles 6 that have a different refractive index than the material of the diffuser 1. As a result, the light of the light source 3 is diffusely scattered at the boundary surfaces between the spheres or particles 6 and the diffuser and thus uniformly distributed. The number of spheres or particles is explained in greater detail later based on FIG. 5.

Figure 2:
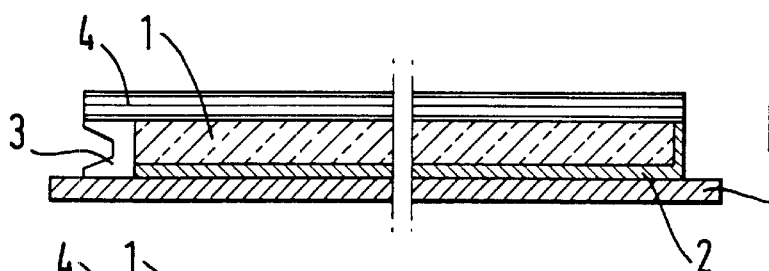
FIG. 2 shows a cross section of a first embodiment of an illumination member according to the present invention.
Figure 3:
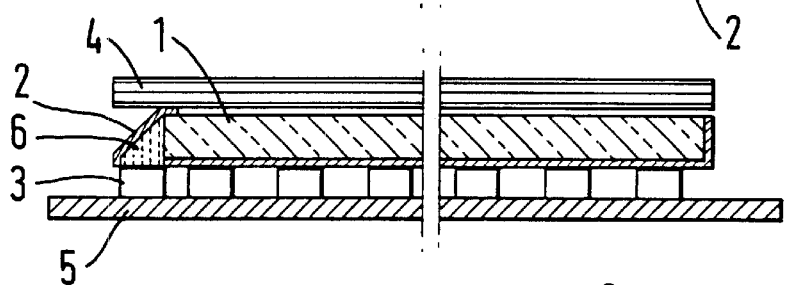
FIG. 3 shows a cross section of a second embodiment of an illumination member according to the present invention.

FIG. 2 shows a second embodiment in which the light source is a light-emitting diode arranged laterally to the diffuser. In this embodiment, the arrangement is fastened via the reflector 2 on a printed circuit board (PCB) 5. FIG. 3 shows a third embodiment in which multiple light-emitting diodes 3 are arranged between the printed circuit board 5 and the diffuser 1, it being possible on a front side to deflect the light of a further light-emitting diode 3 also via a mirror 6 into the diffuser. The reflector 2 is transparent at the contact points with the light-emitting diodes 3.

Figure 4:
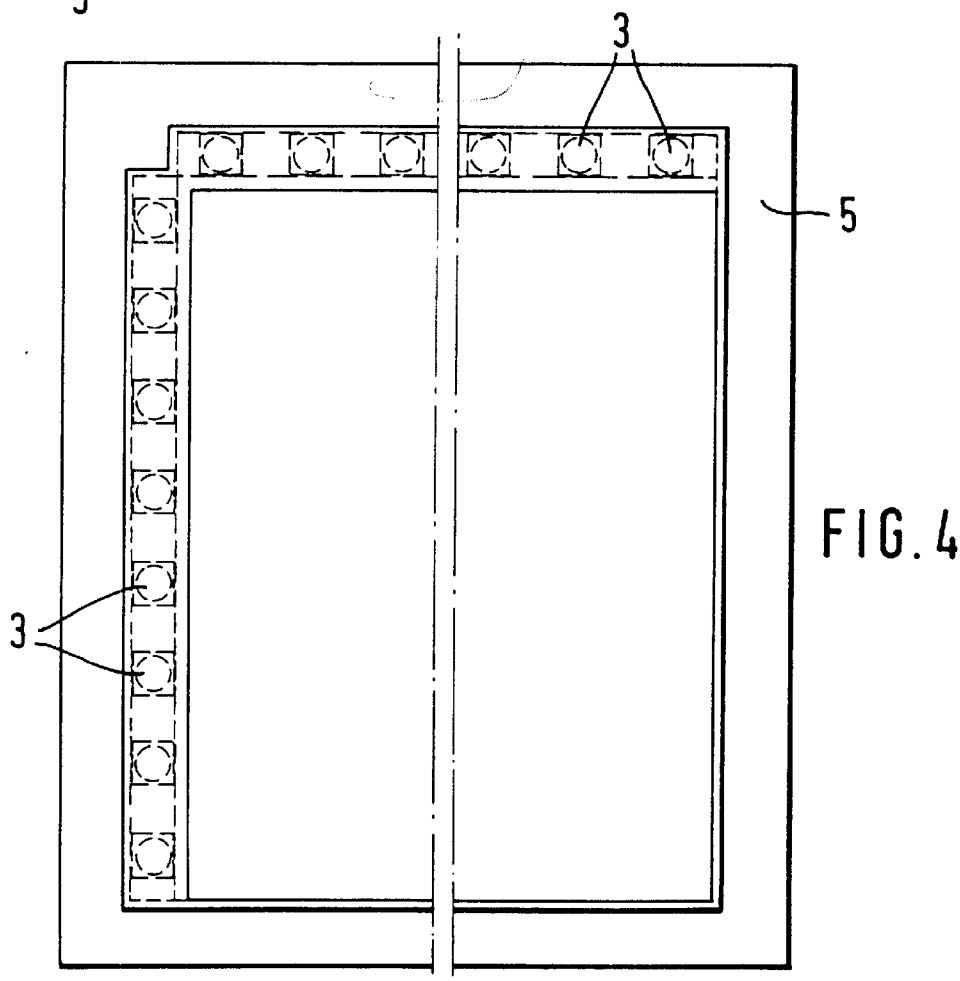
FIG. 4 shows a top view of an embodiment of an illumination member according to the present invention.

FIG. 4 illustrates schematically in a top view the arrangement of the light sources 3 on two faces of the diffuser 1. The number of light sources 3 can be adapted to the desired requirements. The light sources 3 are installed preferably on the printed circuit board 5 so that together with the LC display 4 they form a compact unit.

The functioning of this arrangement is explained in greater detail hereafter. The diffuser 1 consists essentially of a transparent plastic material into which spheres or particles 6 with a different refractive index are distributed. To obtain on the one hand the most uniform light distribution possible and on the other hand a good efficiency for the light transmission, the size of the spheres or particles 6, the homogeneity of the distribution in the diffuser 1 as well as the number of spheres or particles 6 is to be distributed according to the desired conditions. FIG. 5 shows a diagram with the diffusion doping d in the Y axis and the light decoupling length 1 in millimeters in the X axis. The curve 20 shows the average light decoupling length 1 as a function of the diffusion doping. The two boundary curves 21, 22 indicate the scattering range. Based on these curves, a desired light decoupling length can be set according to the doping d. The size of the spheres or particles 6 can be determined experimentally accordingly. In conjunction with the illumination device, i.e., with the type and number of lamps, the luminance in the output face 7 can thus be controlled.

FIG. 6 shows a schematic block diagram for the brightness control unit that can be used, for example, for a car radio in a motor vehicle. It shows the LCD 4 as well as control elements 10. The control elements 10 and the LCD display 4 are connected via lines to a control unit 11. The control unit 11 is powered from a voltage source 12. The control unit 11 and the voltage source 12 are arranged in a suitable location in the car radio 13. The normal brightness is set in sleep mode such that the control elements 10 and/or the LCD 4 are still recognizable without producing a blinding (distracting) effect. Now, if a sensor is activated or one of the buttons 10 is pressed, then this is detected by the control unit 11 and the lamps 3 of the diffuser 1 are set bright enough to allow the control elements 10 or the display 4 to be clearly legible. After a specified time or when the operation is complete, the control unit 11 resets the lamps 3 to sleep mode so that the driver is no longer distracted. Unlike known illumination members, a very uniform light distribution on the output face 7 is still achieved with the present invention even in sleep mode.

The illumination member according to the present invention is particularly suitable for LCDS, measuring devices or operating elements that require a particularly flat design. In a car radio, for example, this is advantageous due to the lack of space.

What is claimed is:

1. An illumination member, comprising:
    a diffuser having an output face, the diffuser receiving light from at least one light source and transmitting the light to the output face, the diffuser including elements having high light-transmission properties, wherein the elements transmit the light received from the at least one light source to the output face as a function of at least one of a geometry of the output face, a number of the elements, a size of the elements, and a homogeneity of the elements in the diffuser; and
    a reflector positioned on a lateral surface of the diffuser.

2. The illumination member according to claim 1, wherein the diffuser further includes a reflector positioned on a surface of the diffuser different from the output face.

3. The illumination member according to claim 1, wherein the elements include a plurality of transparent spheres and transparent particles having a first refractive index, and wherein the diffuser has a second refractive index being different from the first refractive index.

4. The illumination member according to claim 1, wherein the at least one light source includes at least one of a lamp, a tube, and a light-emitting diode.

5. The illumination member according to claim 1, wherein the at least one light source is arranged on a face of the diffuser.

6. The illumination member according to claim 1, further comprising:
    a deflecting mirror arranged on a face of the diffuser.

7. The illumination member according to claim 1, wherein the illumination member illuminates one of a display, a control panel, and a symbol.

8. The illumination member according to claim 1, wherein the illumination member is used in a motor vehicle display.

9. The illumination member according to claim 1, wherein the elements output the light as a function of the geometry of the output face.

10. The illumination member according to claim 1, wherein the elements output the light as a function of the number of the elements.

11. The illumination member according to claim 1, wherein the elements output the light as a function of the size of the elements.

12. The illumination member according to claim 1 wherein the elements output the light as a function of the homogeneity of the elements in the diffuser.

13. The illumination member according to claim 1, wherein the at least one light source is a plurality of light sources positioned at the lateral surface of the diffuser.

14. The illumination member according to claim 1, wherein the diffuser has a thickness of about 3 millimeters.

15. The illumination member according to claim 7, wherein at least one of the display and the control panel includes a transmissive liquid crystal display.

16. The illumination member according to claim 7 further comprising:
    a control unit for increasing a light intensity of the at least one light source for a predetermined time period if at least one of the display, the control panel, and a sensor is pressed.

17. The illumination member according to claim 8, wherein the illumination member is used in a car radio.

18. An illumination member, comprising:
    a diffuser having an output face, the diffuser receiving light from at least one light source and transmitting the light to the output face, the diffuser including elements having high light-transmission properties, wherein the elements transmit the light received from the at least one light source to the output face as a function of at least one of a geometry of the output face, a number of the elements, a size of the elements, and a homogeneity of the elements in the diffuser, and
    a reflector positioned on a lateral surface of the diffuser;
    wherein the elements of the diffuser comprise a plurality of transparent particles, and wherein a diffusion doping level d is linearly and inversely proportional to a light decoupling length l within a scattering value region defined at least by a first value pair and a second value pair, said first value pair having a first d value and a first l value, and said second value pair having a second d value and a second l value.

19. An illumination member, comprising:
    a diffuser having an output face, the diffuser receiving light from at least one light source and transmitting the light to the output face, the diffuser including elements having high light-transmission properties, wherein the elements transmit the light received from the at least one light source to the output face as a function of at least one of a geometry of the output face, a number of the elements, a size of the elements, and a homogeneity of the elements in the diffuser, wherein the elements of the diffuser comprise a plurality of transparent particles, and wherein a diffusion doping level d is linearly and inversely proportional to a light decoupling length l within a scattering value region defined at least by a first value pair and a second value pair, said first value pair having a first d value and a first l value, and said second value pair having a second d value and a second l value.

20. The illumination member according to claim 19 wherein said first d value is between approximately 5.25% and 4.35%, said second d value is approximately 1%, said first l value is approximately 10mm, and said second l value is between approximately 85 mm and 105 mm.

21. The illumination member according to claim 19 wherein said scattering value region is further defined by a third value pair and a fourth value pair, and wherein said first d value is approximately 5.25%, said second d value is approximately 1%, said first l value is approximately 10 mm, said second l value is approximately 105 mm, said third value pair having a third d value of approximately 4.35% and a third l value of approximately 10 mm, and said fourth value pair having a fourth d value of approximately 1% and a fourth l value of approximately 85 mm.

22. An illumination member, comprising:

a diffuser having an output face, the diffuser receiving light from at least one light source and transmitting the light to the output face, the diffuser including elements having high light-transmission properties, wherein the elements transmit the light received from the at least one light source to the output face as a function of a homogeneity of the elements in the diffuser and at least one of a geometry of the output face, a number of the elements and a size of the elements.

23. The illumination member according to claim 22, wherein the at least one light source is a plurality of light sources positioned at a lateral surface of the diffuser.

24. The illumination member according to claim 22, wherein the diffuser has a thickness of about 3 millimeters.

25. The illumination member according to claim 23, wherein the plurality of light sources are disposed at least one lateral edge of the illumination member.

\* \* \* \* \*

UNITED STATES PATENT AND TRADEMARK OFFICE
CERTIFICATE OF CORRECTION

PATENT NO. : 6,447,133 B1
DATED : September 10, 2002
INVENTOR(S) : Bernd Eschke et al.

It is certified that error appears in the above-identified patent and that said Letters Patent is hereby corrected as shown below:

<u>Column 1,</u>
Line 30, change "comparably low advantageous manner", to -- comparably low. --.
Line 40, change "distributing diffusing" to -- diffusing (distributing) --.

Signed and Sealed this

Ninth Day of September, 2003

JAMES E. ROGAN
*Director of the United States Patent and Trademark Office*